(12) United States Patent
Lu

(10) Patent No.: US 11,321,945 B2
(45) Date of Patent: May 3, 2022

(54) VIDEO BLOCKING REGION SELECTION METHOD AND APPARATUS, ELECTRONIC DEVICE, AND SYSTEM

(71) Applicant: HANGZHOU HIKVISION DIGITAL TECHNOLOGY CO., LTD., Hangzhou (CN)

(72) Inventor: Haixian Lu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/756,094

(22) PCT Filed: Sep. 28, 2018

(86) PCT No.: PCT/CN2018/108222
§ 371 (c)(1),
(2) Date: Apr. 14, 2020

(87) PCT Pub. No.: WO2019/076187
PCT Pub. Date: Apr. 25, 2019

(65) Prior Publication Data
US 2021/0056312 A1    Feb. 25, 2021

(30) Foreign Application Priority Data

Oct. 16, 2017   (CN) .......................... 201710957962.X

(51) Int. Cl.
*G06K 9/00*   (2022.01)
*G06V 20/40*   (2022.01)
(Continued)

(52) U.S. Cl.
CPC .......... *G06V 20/41* (2022.01); *G06F 21/6254* (2013.01); *G06N 3/04* (2013.01);
(Continued)

(58) Field of Classification Search
CPC ....... G06K 2009/3291; G06K 9/00718; G06K 9/00744; G06K 9/00771; G06K 9/3241; G06T 2207/10016
See application file for complete search history.

(56) References Cited

U.S. PATENT DOCUMENTS 6,744,461 B1 * 6/2004 Wada .................. H04N 7/18
                                                                348/143
9,471,852 B1 * 10/2016 Feris ...................... G06V 20/52
(Continued)

FOREIGN PATENT DOCUMENTS

CN   101610408   12/2009
CN   101933027   12/2010
(Continued)

OTHER PUBLICATIONS

Office Action issued in Corresponding Chinese Application No. 201710957962.X, dated May 6, 2020 (English Translation provided).
(Continued)

*Primary Examiner* — Amara Abdi
(74) *Attorney, Agent, or Firm* — Norton Rose Fulbright US LLP

(57) ABSTRACT

A method, apparatus, electronic device, and a system for selecting a to-be-masked region in a video are disclosed. The method includes: obtaining a video to be detected; determining specified target sets in the video through a preset target detection algorithm, wherein each specified target set is a set of pixels of one specified target in video frames of the video; determining whether a specified target corresponding to each specified target set is a sensitive target respectively through a preset recognition algorithm; and using a specified target set as to-be-masked regions in the video when a specified target corresponding to this specified target set is determined as a sensitive target. In this method,
(Continued)

specified targets are first determined, and then it is determined whether the specified targets are sensitive targets.

13 Claims, 3 Drawing Sheets

(51) Int. Cl.
    *G06T 7/246*     (2017.01)
    *G06F 21/62*     (2013.01)
    *G06N 3/04*     (2006.01)

(52) U.S. Cl.
    CPC .............. *G06T 7/246* (2017.01); *G06V 20/46* (2022.01); *G06T 2207/10016* (2013.01); *G06T 2207/10024* (2013.01); *G06T 2207/20076* (2013.01); *G06T 2207/30241* (2013.01)

(56) References Cited

U.S. PATENT DOCUMENTS

| | | | |
|---|---|---|---|
| 2004/0017938 A1* | 1/2004 | Cooper | H04N 1/56 382/171 |
| 2005/0129272 A1 | 6/2005 | Rottman | |
| 2007/0116328 A1 | 5/2007 | Sablak et al. | |
| 2007/0201694 A1* | 8/2007 | Bolle | G06T 1/0021 380/205 |
| 2014/0211002 A1* | 7/2014 | Lin | G06V 20/54 348/143 |

FOREIGN PATENT DOCUMENTS

| | | | |
|---|---|---|---|
| CN | 103167216 | 6/2013 | |
| CN | 103839057 | * 6/2014 | ............... G06K 9/00 |
| CN | 104318782 | 1/2015 | |
| CN | 105141901 | 12/2015 | |
| CN | 105469379 | 4/2016 | |
| CN | 105957001 | 9/2016 | |
| CN | 106127106 | 11/2016 | |
| CN | 106454492 | 2/2017 | |
| CN | 107247956 | 10/2017 | |

OTHER PUBLICATIONS

Extended European Search Report issued in Corresponding European Application No. 18868676.0, dated Jul. 29, 2020.
Ribaric et al., "De-identification for privacy protection in multimedia content: A survey" *Signal Processing: Image Communication* 2016, 47, 131-151.
Tansuriyavong et al., "Privacy protection by concealing persons in circumstantial video image" *Perceptive User Interfaces* 2001, 1-4.
International Search Report and Written Opinion issued in corresponding PCT application No. PCT/CN2018/108222, dated Jan. 3, 2019 (English translation of International Search Report provided).

\* cited by examiner

VIDEO BLOCKING REGION SELECTION METHOD AND APPARATUS, ELECTRONIC DEVICE, AND SYSTEM

CROSS REFERENCE TO RELATED APPLICATIONS

The present application is a national phase application under 35 U.S.C. § 371 of International Application No. PCT/CN2018/108222, filed Sep. 28, 2018, which claims the benefit of priority to Chinese patent application No. 201710957962.X, filed with the China National Intellectual Property Administration on Oct. 16, 2017 and entitled "Video Blocking Region Selection Method and Apparatus, Electronic Device, and System", each of which are incorporated herein by reference in their entirety.

TECHNICAL FIELD

The present application relates to the technical field of computer vision, and in particular to a method, apparatus, electronic device and system for selecting a to-be-masked region in a video.

BACKGROUND

With the development of network technologies and the popularity of image capturing devices, videos have become one of the major means for information communication. People may record various events in their lives with portable video capturing devices, such as mobile phones or digital cameras, and transmit and show the recorded events on the Internet. However, the videos may contain sensitive information, such as license plate numbers, ID card numbers, and bank card numbers etc. Therefore, the videos have to be desensitized. Video desensitization may be completed manually or automatically. Though having a high accuracy, manual video desensitization requires people to label to-be-masked regions frame by frame, which is labor consuming and inefficient. It is impossible to manually desensitize massive videos on the Internet one by one.

The existing technique for automatic video desensitization selects a to-be-masked region in a video by detecting a moving target in a video frame of the video and predicting an area of the moving target in subsequent frames using a target tracking method. The predicted area is used as the to-be-masked region. However, such an approach for selecting a region to be marked in a video may be inaccurate due to inaccurate prediction of trajectory of the target.

SUMMARY

The objective of embodiments of the present application is to provide a method, an apparatus, an electronic device and a system for selecting a to-be-masked region in a video, so as to improve the accuracy of selecting the to-be-masked region. The specific technical solutions are as follows.

In the first aspect, an embodiment of the present application provides a method for selecting a to-be-masked region in a video, which includes:

obtaining a video to be detected;

determining specified target sets in the video through a preset target detection algorithm, wherein each specified target set is a set of pixels of one specified target in video frames of the video;

determining whether a specified target corresponding to each specified target set is a sensitive target respectively through a preset recognition algorithm; and using a specified target set as to-be-masked regions in the video when a specified target corresponding to this specified target set is determined as a sensitive target.

Optionally, after using each specified target set as to-be-masked regions in the video when a specified target corresponding to this specified target set is determined as a sensitive target, the method further includes:

masking the to-be-masked regions in the video frames of the video.

Optionally, determining specified target sets in the video through a preset target detection algorithm includes:

detecting regions corresponding to all specified targets in each video frame of the video respectively through the preset target detection algorithm;

for each of the specified targets, associating regions corresponding to the specified target in chronological order to obtain a trajectory of the specified target; and using the trajectories of the specified targets as the specified target sets for the specified targets in the video.

Optionally, detecting regions corresponding to all specified targets in each video frame of the video respectively through the preset target detection algorithm includes:

partitioning each video frame of the video into a preset number of regions to obtain a plurality of pixel regions;

extracting a feature of each pixel region respectively through a pre-trained convolutional neural network;

determining whether each pixel region matches with any of the specified targets through a preset classifier according to the feature of the pixel region; and in response to a pixel region matching with a specified target, determining a region corresponding to the specified target through a bounding box regression algorithm based on all pixel regions matching with the specified target.

Optionally, for each of the specified targets, associating regions corresponding to the specified target in chronological order to obtain a trajectory of the specified target includes:

extracting features of regions corresponding to all the specified targets in each video frame of the video to obtain region features;

determining a set of region features corresponding to each specified target respectively from all the region features through a preset multi-target tracking algorithm; and associating regions corresponding to each set of region features in chronological order respectively to obtain a trajectory of each specified target.

Optionally, determining whether a specified target corresponding to each specified target set is a sensitive target respectively through the preset recognition algorithm includes:

for each specified target set, selecting a preset number of specified target video frames from video frames corresponding to the specified target set according to a preset video frame extraction manner;

recognizing the specified target in all specified target video frames through a preset recognition algorithm to obtain a target recognition result;

determining that the specified target corresponding to the target recognition result is a sensitive target when the target recognition result meets a preset determination rule; or determining that the specified target corresponding to the target recognition result is not a sensitive target when the target recognition result does not meet the preset determination rule.

Optionally, recognizing specified targets in all specified target video frames through a preset recognition algorithm to obtain a target recognition result includes:

extracting features of the specified targets in all the specified target video frames to obtain target features;

recognizing sensitive features from the target features through a preset target classification algorithm or a recognition algorithm; and using a relation between the number of the sensitive features and the number of all the target features as the target recognition result.

In the second aspect, an embodiment of the present application provides an apparatus for selecting a to-be-masked region in a video, which includes:

a video obtaining module, configured for obtaining a video to be detected;

a specified set determining module, configured for determining specified target sets in the video through a preset target detection algorithm, wherein each specified target set is a set of pixels of one specified target in video frames of the video;

a sensitive target determining module, configured for determining whether a specified target corresponding to each specified target set is a sensitive target respectively through a preset recognition algorithm; and a to-be-masked region selection module, configured for using a specified target set as to-be-masked regions in the video when a specified target corresponding to this specified target set is determined as a sensitive target.

Optionally, the apparatus for selecting a to-be-masked region in a video further includes:

a masking module, configured for masking the to-be-masked regions in the video frames of the video.

Optionally, the specified set determining module includes:

a target detection sub-module, configured for detecting regions corresponding to all specified targets in each video frame of the video respectively through the preset target detection algorithm;

a target association sub-module, configured for, for each of the specified targets, associating regions corresponding to the specified target in chronological order to obtain a trajectory of the specified target; and a target set sub-module, configured for using the trajectories of the specified targets as the specified target sets for the specified targets in the video.

Optionally, the target detection sub-module includes:

a region partition unit, configured for partitioning each video frame of the video into a preset number of regions to obtain a plurality of pixel regions;

a first feature obtaining unit, configured for extracting a feature of each pixel region respectively through a pre-trained convolutional neural network;

a target matching unit, configured for determining whether each pixel region matches with any of the specified targets through a preset classifier according to the feature of the pixel region; and a region determining unit, configured for, in response to a pixel region matching with a specified target, determining a region corresponding to the specified target through a bounding box regression algorithm based on all pixel regions matching with the specified target.

Optionally, the target association sub-module includes:

a second feature obtaining unit, configured for extracting features of regions corresponding to all the specified targets in each video frame of the video to obtain region features;

a set determining unit, configured for determining a set of region features corresponding to each specified target respectively from all the region features through a preset multi-target tracking algorithm; and a target trajectory determining unit, configured for associating regions corresponding to each set of region features in chronological order respectively to obtain a trajectory of each specified target.

Optionally, the sensitive target determining module includes:

a video frame selection sub-module, configured for, for each specified target set, selecting a preset number of specified target video frames from video frames corresponding to the specified target set according to a preset video frame extraction manner;

a first determination sub-module, configured for recognizing the specified target in all specified target video frames through a preset recognition algorithm to obtain a target recognition result; and a second determination sub-module, configured for determining that the specified target corresponding to the target recognition result is a sensitive target when the target recognition result meets a preset determination rule; or determining that the specified target corresponding to the target recognition result is not a sensitive target when the target recognition result does not meet the preset determination rule.

Optionally, the first determination sub-module includes:

a third feature obtaining unit, configured for extracting features of the specified targets in all the specified target video frames to obtain target features;

a sensitive feature recognition unit, configured for recognizing sensitive features from the target features through a preset target classification algorithm or a recognition algorithm; and a recognition result determining unit, configured for using a relation between the number of the sensitive features and the number of all the target features as the target recognition result.

In the third aspect, an embodiment of the present application provides an electronic device including a processor and a memory.

The memory is configured for storing a computer program.

The processor is configured for executing the program stored in the memory to perform operations including:

obtaining a video to be detected;

determining specified target sets in the video through a preset target detection algorithm, wherein each specified target set is a set of pixels of one specified target in video frames of the video;

determining whether a specified target corresponding to each specified target set is a sensitive target respectively through a preset recognition algorithm; and using a specified target set as to-be-masked regions in the video when a specified target corresponding to this specified target set is determined as a sensitive target.

Optionally, the operation further includes:

masking the to-be-masked regions in the video frames of the video.

Optionally, in the electronic device according to the embodiment of the present application, determining specified target sets in the video through a preset target detection algorithm includes:

detecting regions corresponding to all specified targets in each video frame of the video respectively through the preset target detection algorithm;

for each of the specified targets, associating regions corresponding to the specified target in chronological order to obtain a trajectory of the specified target; and using the trajectories of the specified targets as the specified target sets for the specified targets in the video.

Optionally, in the electronic device according to the embodiment of the present application, detecting regions corresponding to all specified targets in each video frame of the video respectively through the preset target detection algorithm includes:

partitioning each video frame of the video into a preset number of regions to obtain a plurality of pixel regions;

extracting a feature of each pixel region respectively through a pre-trained convolutional neural network;

determining whether each pixel region matches with any of the specified targets through a preset classifier according to the feature of the pixel region; and in response to a pixel region matching with a specified target, determining a region corresponding to the specified target through a bounding box regression algorithm based on all pixel regions matching with the specified target.

Optionally, in the electronic device according to the embodiment of the present application, for each of the specified targets, associating regions corresponding to the specified target in chronological order to obtain a trajectory of the specified target includes:

extracting features of regions corresponding to all the specified targets in each video frame of the video to obtain region features;

determining a set of region features corresponding to each specified target respectively from all the region features through a preset multi-target tracking algorithm; and associating regions corresponding to each set of region features in chronological order respectively to obtain a trajectory of each specified target.

Optionally, in the electronic device according to the embodiment of the present application, for each specified target set, selecting a preset number of specified target video frames from video frames corresponding to the specified target set according to a preset video frame extraction manner;

recognizing the specified target in all specified target video frames through a preset recognition algorithm to obtain a target recognition result;

determining that the specified target corresponding to the target recognition result is a sensitive target when the target recognition result meets a preset determination rule; or determining that the specified target corresponding to the target recognition result is not a sensitive target when the target recognition result does not meet the preset determination rule.

Optionally, in the electronic device according to the embodiment of the present application, recognizing specified targets in all specified target video frames through a preset recognition algorithm to obtain a target recognition result includes:

extracting features of the specified targets in all the specified target video frames to obtain target features;

recognizing sensitive features from the target features through a preset target classification algorithm or a recognition algorithm; and using a relation between the number of the sensitive features and the number of all the target features as the target recognition result.

In the fourth aspect, an embodiment of the present application provides a computer readable storage medium having stored thereon a computer program that, when executed by a processor, causes the processor to carry out steps of any of the methods according the first aspect.

In the fifth aspect, an embodiment of the present application provides a system for selecting a to-be-masked region in a video, which includes a video capturing device and a video processor.

The video capturing module is configured for capturing a video to be detected.

The video processor is configured for carrying out the steps of any of the methods according to the first aspect.

As seen from the above technical solutions, in the method, apparatus and system for selecting a to-be-masked region in a video and the electronic device, a video to be detected is obtained. Specified target sets in the video to be detected are determined through a preset target detection algorithm, wherein each specified target set is a set of pixels of one specified target in video frames of the video. A determination is made as to whether a specified target corresponding to each specified target set is a sensitive target respectively through a preset recognition algorithm. When a specified target corresponding to a specified target set is determined as a sensitive target, this specified target set is used as to-be-masked regions of the video to be detected. The specified targets in each video frame are detected through the target detection algorithm, and pixels of the specified targets are used as respective specified target sets, which can improve the accuracy of selecting the to-be-masked regions. The sensitivity of the specified targets is determined again through the recognition algorithm, which can reduce incorrect extraction of sensitive targets and improve the accuracy of selecting the to-be-masked regions. Certainly, it is not necessary for any product or method according to the present application to achieve all the above advantageous at the same time.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can obtain other drawings based on the drawings herein without any creative efforts.

DETAILED DESCRIPTION

In order to make objectives, technical solutions and advantages of the present application more apparent, specific details of the present application will be given with reference to the accompanying drawings and by way of examples. Obviously, the embodiments described herein are only some of the embodiments of the present application instead of all of them. Any other embodiments obtained by those of ordinary skills in the art based on the embodiments herein without any creative efforts are within the scope of the present application.

Video desensitization is the technique for hiding information of a video. The main purpose for applying video desensitization to the video is to mask the sensitive and private information in the video by obfuscating or making a mosaic on the sensitive and private information in the video, such as faces. In related art, existing approaches for video desensitization selects a to-be-masked region in the video by detecting a to-be-masked target in an image frame of the video and predicting an area of the target in subsequent image frames using a target tracking method. This area is used as the to-be-masked region. However, such approaches are disadvantages. 1. These approaches are based on a moving object detection method. When a target to be detected is stationary or is moving with a low speed relative to the background, an incomplete to-be-masked region may be determined. 2. The existing approaches for video desensitization selects the to-be-masked region without further classifying the detected target information. Thus, there may be false masking. For example, the to-be-masked region in a video is a region of a human wearing a police uniform, but all humans in the video may be masked undesirably.

Figure 1:
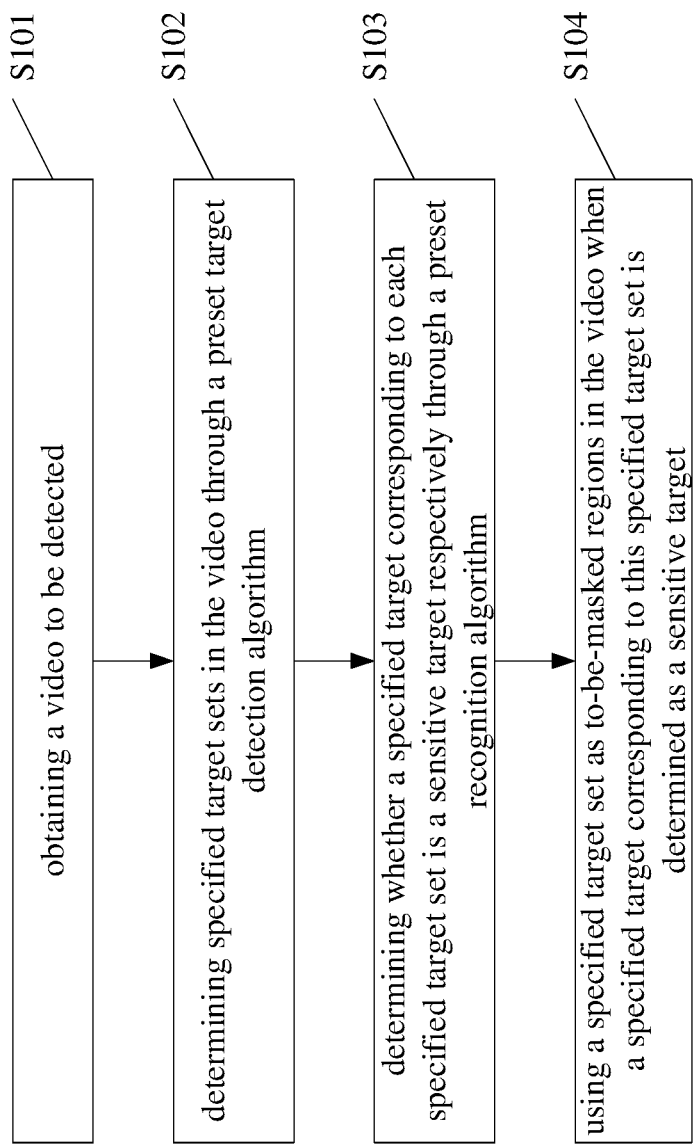
FIG. 1 is a flowchart of a method for selecting a to-be-masked region in a video according to an embodiment of the present application.

For the above problems, an embodiment of the present application provides a method for selecting a to-be-masked region in a video, as shown in FIG. 1. The method includes following operations.

At step S101, a video to be detected is obtained.

The method for selecting a to-be-masked region in a video according to the embodiment of the present application may be implemented by a desensitization system. The desensitization system may be any system that can implement the method for selecting a to-be-masked region in a video according to the embodiment of the present application.

For example, the desensitization system may be an electronic device including a processor, a memory, a communication interface, and a bus. The processor, the memory, and the communication interface are connected and communicate with each other through the bus. The memory stores executable program codes, and the processor reads the executable program codes stored in the memory and executes a program corresponding to the executable program codes, so as to carry out the method for selecting a to-be-masked region in a video.

The desensitization system may also be an application program that, when executed, carries out the method for selecting a to-be-masked region in a video.

The desensitization system may further be a storage medium that stores executable codes for carrying out the method for selecting a to-be-masked region in a video.

The desensitization system may obtain the video to be detected from a storage device, or may obtain the video to be detected in real time with an image capturing device. Optionally, the desensitization system may have a built-in video shooting device or is connected to a peripheral video shooting device. The desensitization system uses the built-in video shooting device or the peripheral video shooting device to acquire the video to be detected in real time. The desensitization system obtains the video to be detected in real time with the video shooting device, which makes the desensitization system be sufficiently rapidly able to obtain the video to be detected, and makes it convenient for users to process real-time videos, and thus provides a good user experience.

At step S102, specified target sets in the video to be detected are determined through a preset target detection algorithm, wherein each specified target set is a set of pixels of one specified target in video frames of the video.

The desensitization system detects all specified targets in each video frame of the video to be detected by using the preset target detection algorithm, and associates all regions (a region in a video frame is composed of pixels) corresponding to each specified target respectively. The specified target sets for all specified targets are then obtained.

The preset target detection algorithm may be any algorithm that can identify a specified target, for example Boosting, RCNN (Regions with Convolutional Neural Networks), FRCNN (Fast Regions with Convolutional Neural Networks), Faster RCNN (Faster Regions with Convolutional Neural Networks), and SSD (Single Shot MultiBox Detector), etc. The specified target may be a preset target that needs to be masked, for example, license plates of vehicles, ID cards, and bank cards shown in a video, etc.

At step S103, a determination is made as to whether a specified target corresponding to each specified target set is a sensitive target respectively through a preset recognition algorithm.

The preset recognition algorithm may be any target classification or recognition technology capable of recognizing targets, such as SIFT (Scale-Invariant Feature Transform), Dense SIFT, Color SIFT, and HOG (Histogram of Oriented Gradient), and the like. The sensitive target may be a preset target that needs to be masked, such as license plates of police cars, ID cards of the juveniles or a bank card with specified card number, etc. The further classification or identification of the detected specified targets prevents non-sensitive targets similar to the sensitive targets from being incorrectly extracted, allowing for a more accurate extraction of sensitive targets.

At step S104, when a specified target corresponding to a specified target set is determined as a sensitive target, the specified target set is used as to-be-masked regions in the video.

When a sensitive target is detected, the desensitization system uses the specified target set for this sensitive target, i.e. the specified target set for a specified target that is determined as the sensitive target, as the to-be-masked region in the video to be detected.

In the embodiment of the present application, a specified target or targets in each video frame are detected by using the target detection algorithm, and pixels of each specified target in all frames are used as a specified target set. It is not required to predict the trajectory of a moving target, and thus it can more accurately determine a region corresponding to a specified target that is stationary or almost stationary relative to the background. The specified target or targets are classified or recognized by using the recognition algorithm to determine the sensitivity of the specified targets again, which can reduce erroneous extraction of sensitive targets and improve the accuracy of selecting the to-be-masked regions. An automatic extraction of the to-be-masked region is achieved, which avoids a lot of work for labeling the to-be-masked regions manually and yield a highly efficient extraction of the to-be-masked regions.

Optionally, after using each specified target set as to-be-masked regions in the video when a specified target corresponding to this specified target set is determined as a sensitive target, the method further includes:

masking the to-be-masked regions in the video frames of the video to be detected.

The desensitization system masks pixels corresponding to the to-be-masked regions in the video frames of the video for example by creating mosaic or adding gray color to the pixels.

In the embodiment of the present application, the video to be detected is desensitized by masking the pixels in the to-be-masked regions in the video frames of the video to be detected.

Optionally, the determination of specified target sets in the video to be detected through a preset target detection algorithm includes following steps.

Step 1, detecting regions corresponding to all specified targets in each video frame of the video to be detected respectively through the preset target detection algorithm.

The desensitization system uses the preset target detection algorithm to detect or determine all specified targets in each video frame of the video to be detected and regions corresponding to the specified targets in this video frame.

Step 2, for each of the specified targets, associating regions corresponding to the specified target in chronological order to obtain a trajectory of the specified target.

After the desensitization system detects the regions corresponding to the specified targets in each video frame, it needs to recognize which regions in the video frames corresponds to a same specified target. For example, the desensitization system may determine regions corresponding to a same specified target by using a preset target tracking algorithm, such as a MeanShift-based target tracking algorithm, a TLD (Tracking-Learning-Detection) algorithm, an IVT (Incremental Visual Tracking) algorithm, or an MIL (Multi-instance learning) algorithm, etc. Alternatively, the desensitization system may determine regions corresponding to a same specified target by using a preset target classification algorithm or a recognition algorithm. The desensitization system associates the regions corresponding to each specified target in all video frames in chronological order. The desensitization system thus obtains trajectories of specified targets, the number of which is the same as that of the specified targets.

Step 3, using the trajectories of the specified targets as the specified target sets for the specified targets in the video to be detected.

For each specified target, the desensitization system uses the trajectory of the specified target as the specified target set for the specified target. If the specified target is a stationary, its trajectory may be a set of pieces of information of a same position. For example, if a specified target is stationary, the position of the specified target identified in each video frame does not vary. Therefore, pixels at this position in the video frames may be used as the specified target set for this specified target.

In the embodiment of the present application, regions corresponding to the specified targets are determined by using the target detection algorithm, and regions corresponding to a same specified target are associated in chronological order to obtain a specified target set. In comparison with a moving target detection method or a sensitive region segmentation method, the embodiment of the present application can more accurately determine regions corresponding to a specified target that is stationary or almost stationary relative to the background, and obtain a more accurate specified target set.

Optionally, the detection of regions corresponding to all specified targets in each video frame of the video respectively through the preset target detection algorithm includes following steps.

Step 1, partitioning each video frame of the video to be detected into a preset number of regions to obtain a plurality of pixel regions.

The desensitization system partitions each video frame into the preset number of regions. These regions may be overlapped. The preset number is set depending on the required recognition accuracy and the resolution of the video frames. There may be a positive correlation between the preset number and the required recognition accuracy and the resolution of the video frames. For example, the preset number may be 100, 500, 1000, or more.

Step 2, extracting a feature of each pixel region respectively through a pre-trained convolutional neural network k.

The pre-trained convolutional neural network may be established under supervised learning. In order to establish a neural network for the purpose of extracting a region corresponding to a specified target, regions corresponding to a plurality of specified targets are input for supervised learning to determine identification features of the regions corresponding to the specified targets. For example, an SVM (Support Vector Machine) algorithm is used. Features of images including a region corresponding to a specified target are used as feature values, and an input vector is determined based on the above feature values and the change rate of the feature values. The training is performed using a linear kernel function and an RBF (Radial Basis Function) training algorithm. A function with better performance with respect to the test set is selected to complete the training for the convolutional neural network.

Step 3, determining whether each pixel region matches with any of the specified targets through a preset classifier according to the feature of the pixel region.

A video to be detected may contain more than one types of specified targets, such as license plates of vehicles and ID cards of people. Therefore, features of the pixel regions need to be classified by the classifier to further determine whether the features of the pixel regions match with the identification feature of a specified target.

Step 4, in response to a pixel region matching with a specified target, determining a region corresponding to the specified target through a bounding box regression algorithm based on all pixel regions matching with the specified target.

For pixel regions in each video frame, when there is a pixel region matching with a specified target, the desensitization system combines all pixel regions matching with the specified target in this video frame to determine a region candidate. The desensitization system then uses the bounding box regression algorithm to refine the region candidate to obtain the region corresponding to the specified target.

In the embodiment of the present application, a specific process for determining a region corresponding to a specified target is provided. Of course, in an embodiment of the present application, the region corresponding to each specified target may also be determined by using algorithms such as Boosting, FRCNN, Faster RCNN, SSD, or the like.

Optionally, for each of the specified targets, the association of regions corresponding to the specified target in chronological order to obtain a trajectory of the specified target includes:

Step 1, extracting features of regions corresponding to all the specified targets in each video frame of the video to be detected to obtain region features.

A region feature may be any feature that can identify a specified target. The desensitization system extracts the region features of the specified targets through a preset multi-target tracking algorithm.

Step 2, determining a set of region features corresponding to each specified target respectively from all the region features through a preset multi-target tracking algorithm.

The multi-target tracking algorithm may be a TLD (Tracking-Learning-Detection) algorithm, an ITV (Incremental Visual Tracking) algorithm, or an MIL (Multi-instance learning) algorithm, etc. The desensitization system determines region features corresponding to a same specified target by using the multi-target tracking algorithm, and uses all the region features corresponding to the same specified target as a set of region features.

Step 3, associating regions corresponding to each set of region features in chronological order respectively to obtain a trajectory of each specified target.

In the embodiment of the present application, the multi-target tracking algorithm is used to determine the specified target trajectories, which can more quickly determine the specified target trajectories.

Optionally, for each of the specified targets, the association of regions corresponding to the specified target in chronological order to obtain a trajectory of the specified target includes following steps.

Step 1, extracting RGB (Red-Green-Blue) color histograms for regions corresponding to each specified target.

Step 2, for every two temporally adjacent video frames, calculating a Euclidean distance between an RGB color histogram for a region corresponding to the specified target in one video frame and an RGB color histogram for a region corresponding to the specified target in the subsequent video frame.

Step 3, associating regions, between which the Euclidean distances are less than a preset threshold, corresponding to the specified target in chronological order, to obtain the trajectory of the specified target.

When the Euclidean distance between two specified targets in different video frames is less than the preset threshold, the two specified targets are the same specified target, and the regions corresponding to the two specified targets are associated. For example, a first video frame includes a specified target 1 and a specified target 2, and a second video frame after the first video frame in time includes a specified target 3 and a specified target 4. The Euclidean distance between the RGB color histogram of the specified target 1 and that of the specified target 3 is 0.02. The Euclidean distance between the RGB color histogram of the specified target 1 and that of the specified target 4 is 0.58. The Euclidean distance between the RGB color histogram of the specified target 2 and that of the specified target 3 is 0.67. The Euclidean distance between the RGB color histogram of the specified target 2 and that of the specified target 4 is 0.09. The preset threshold is 0.1. As a result, the region corresponding to the specified target 1 and the region corresponding to the specified target 3 are associated, and the region corresponding to the specified target 2 and the region corresponding to the specified target 4 are associated.

The preset threshold may be set depending on the actual image resolution, and there may be a positive correlation between the preset threshold and the image resolution. For example, the preset threshold may be set to such as 0.3, 0.2, 0.1, or 0.05.

In the embodiment of the present application, the specified target trajectories are determined through the Euclidean distance, the calculation method is simple, and the calculation cost is saved.

Optionally, the determination as to whether a specified target corresponding to each specified target set is a sensitive target respectively through the preset recognition algorithm includes following steps.

Step 1, for each specified target set, selecting a preset number of specified target video frames from video frames corresponding to the specified target set according to a preset video frame extraction manner.

The preset video frame extraction method may be any method for extracting video frames. For example, a manner indicates that one video frame is extracted every 15 frames and a total of 5 video frames are to be extracted. For another example, a manner indicates that a total of 3 video frames are to be extracted. In this case, for a specified target set including a total of 9 video frames, the 3rd video frame, the 6th video frame, and the 9th video frame are extracted respectively.

Step 2, recognizing the specified target in all specified target video frames through a preset recognition algorithm to obtain a target recognition result.

The desensitization system uses the preset recognition algorithm, including target classification or recognition technique, to perform recognition on all the specified target video frames to obtain the target recognition result. For example, for a specified target set, a total of 5 specified target video frames are extracted. In this case, specified targets in 4 specified target video frames are recognized as the sensitive targets, and the specified target in the remaining one specified target video frame is recognized as non-sensitive target through the preset recognition algorithm. The corresponding target recognition result may be that 4 frames include the sensitive target and 1 frame includes no sensitive target; or may be that the probability that the specified target corresponding to the specified target set is a sensitive target is 80%.

Step 3, determining that the specified target corresponding to the target recognition result is a sensitive target when the target recognition result meets a preset determination rule; otherwise, determining that the specified target corresponding to the target recognition result is not a sensitive target when the target recognition result does not meet the preset determination rule.

The preset determination rule may be set according to actual requirements. For example, the preset determination rule may be that: when the probability that a specified target corresponding to the specified target set is a sensitive target is not less than a preset similarity threshold, the specified target corresponding to the target recognition result is determined as a sensitive target. The preset similarity threshold may be set according to actual circumstances, for example, it may be set to 80%, 90%, or 95%, etc. For example, the preset similarity threshold is set to 80%. When the target recognition result is that the probability that the specified target is a sensitive target is 80%, it is determined that the specified target corresponding to the target recognition result is a sensitive target. When the target recognition result is that the probability that the specified target is a sensitive target is 60%, it is determined that the specified target corresponding to the target recognition result is not a sensitive target.

In the embodiment of the present application, one specified target is recognized multiple times to determine whether this specified target is a sensitive target based on the results obtained from the multiple recognitions. In this way, the occasionality during the determination is reduced resulting in a more accurate determination. The further classification or identification of the detected specified targets prevents non-sensitive targets similar to the sensitive targets from being incorrectly extracted, allowing for a more accurate extraction of sensitive targets.

Optionally, the recognition of the specified target in all specified target video frames through a preset recognition algorithm to obtain a target recognition result includes following steps.

Step 1, extracting features of the specified targets in all the specified target video frames to obtain target features.

Step 2, recognizing sensitive features from the target features through a preset target classification algorithm or a recognition algorithm.

For example, the HOG algorithm is used to recognize the sensitive feature. The desensitization system performs image normalization on the target video frame, and calculates the gradient of the normalized target video frame to obtain a histogram of gradient. The histogram of gradient is divided into a preset number of cells depending on the type of the target subject, and the histogram of gradient is divided into a preset number of blocks. For example, when the target is a human body, each cell may be set to 6×6 pixels, each block may be set to 3×3 cells. A projection with a preset weight is performed on each cell, to obtain a histogram vector. Contrast normalization is performed on overlapping cells in each block to obtain a histogram vector. The histogram vectors of all blocks are combined into a HOG feature vector as a target feature. When the target feature and the HOG feature vector of a preset sensitive target conform to a preset similarity condition, such as higher than a preset similarity threshold (the similarity threshold may be set depending on the resolution of the video frames and may have a positive correlation with the resolution, for example, it may be set to 70%, 80%, or 90%, etc.), the target feature is determined as a sensitive feature.

Step 3, using a relation between the number of the sensitive features and the number of all the target features as the target recognition result.

The target recognition result is used to represent the relation between the number of the sensitive features and the number of the target features. For example, the target recognition result may be that the number of the sensitive features is 8 and the number of all the target features is 10; or that the target recognition result is 8/10.

In the embodiment of the present application, a specific process for determining the target recognition result is provided, which reduces the occasionality during the determination process and results in a more accurate determination result.

Figure 2:
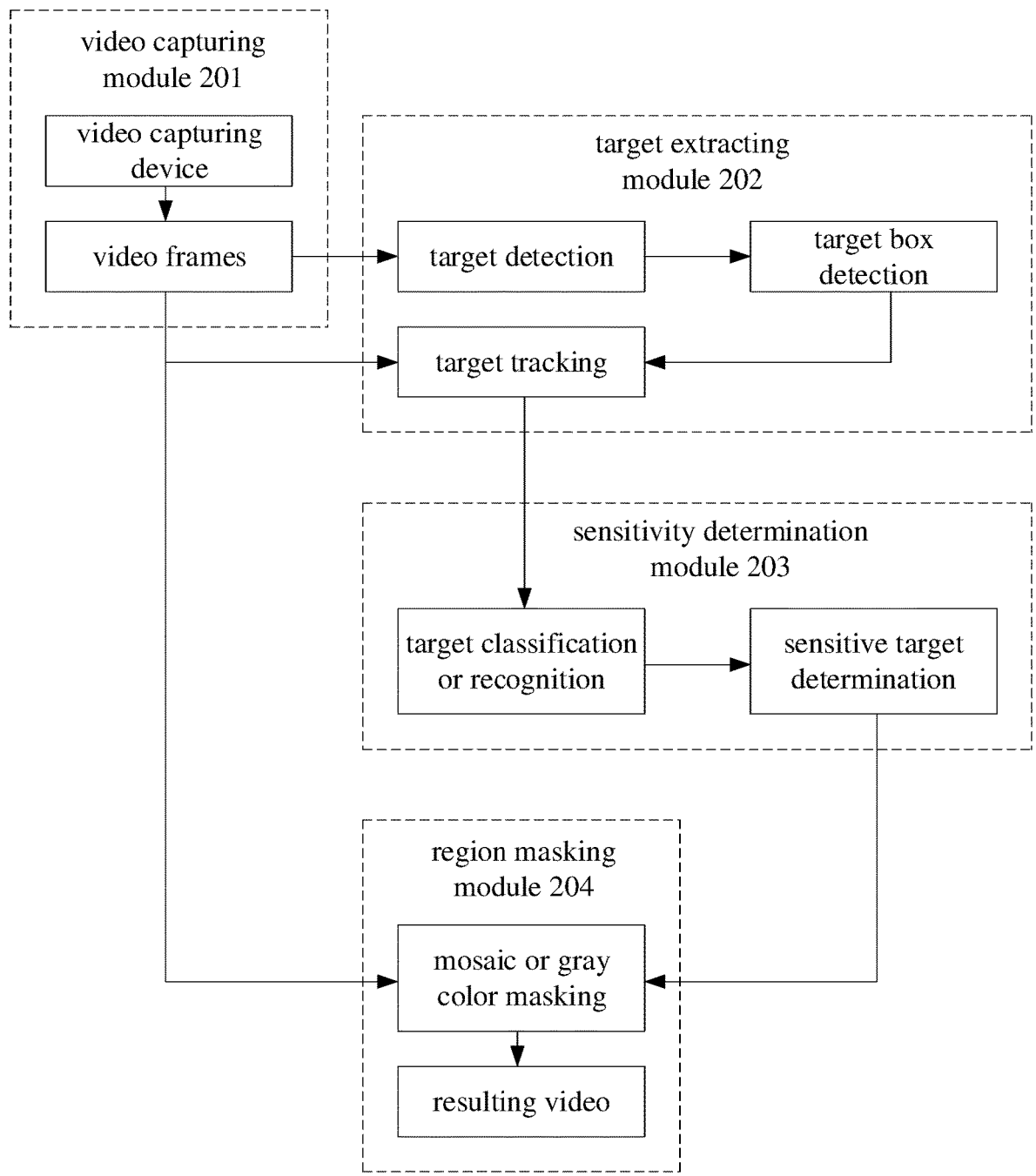
FIG. 2 is another flowchart of a method for selecting a to-be-masked region in a video according to an embodiment of the present application.

Referring to FIG. 2, FIG. 2 shows another flowchart of the method for selecting a to-be-masked region in a video according to an embodiment of the present application, which includes following operations.

A video capturing module 201 captures a video to be detected.

The video capturing module 201 is constituted by a video capturing device capable of recording videos, such as a camera. The video capturing device in the video capturing module 201 captures the scene of the environment to generates video frames of the scene, and transmits the captured video frames to other modules.

A target extracting module 202 extracts specified targets in video frames by using a preset target detection algorithm, and associates specified targets that are actually a same one in chronological order to obtain a respective specified target set.

Optionally, the target extracting module 202 includes a target detection sub-module and a target tracking and associating sub-module. The target extracting module 202 obtains video frames sent by the video capturing module 201. The target detection sub-module detects specified targets and determine target boxes of the specified targets in the video frames captured by the video capturing module 201 through a preset target detection algorithm, such as Boosting, RCNN, FRCNN, Faster RCNN, or SSD, etc. For each specified target, the target detection sub-module uses the region within the target box of the specified target as a region corresponding to the specified target. The target tracking and associating sub-module tracks the specified targets in the video frames respectively by using a multi-target tracking algorithm, such as a TLD algorithm, an ITV algorithm or an MIL algorithm; associates specified targets that are actually the same one in chronological order respectively to form a respective specified target set; and assigns an ID to each specified target set.

A sensitivity determination module 203 determines whether the specified target corresponding to each specified target set is a sensitive target respectively through a preset target classification or recognition technique.

After a new specified target set is determined, the sensitivity determination module 203 performs sensitivity analysis on a specified target corresponding to the newly generated ID. the sensitivity determination module 203 determines whether the specified target is a sensitive target, such as a specific person or a police car, through the target classification or recognition technique, such as SIFT, Dense SIFT, Color SIFT, HOG, etc. Further determinations are made as to whether the specified target is a sensitive target subsequently every certain number of frames. A final determination is made from the results of the several determinations by voting, to determine whether the specified target is a sensitive target. For example, a specified target appears in 9 frames, and one video frame is selected every 3 frames to determine whether the specified target in these frames is a sensitive target. In this case, three determinations are made in total. If at least two of the three determinations show that the specified target is a sensitive target, the specified target corresponding to this ID is finally determined as a sensitive target. With multiple determinations as to whether a specified target is a sensitive target, the determining the sensitive target can be more robust avoiding incorrect determinations.

A region masking module 204 masks a specified target set when the specified target corresponding to this specified target set is a sensitive target.

When the sensitivity determination module 203 determines that the specified target corresponding to an ID is a sensitive target, the region masking module 204 masks regions (pixels) corresponding to the specified target in video frames of the specified target set with the ID for example by creating mosaics or adding gray color, so as to desensitize the video.

In the embodiment of the present application, the target extracting module 202 determines a specified target through the target detection algorithm. In comparison with a moving target detection method or a sensitive region segmentation method, this can more accurately determine regions corresponding to a specified target that is stationary or almost stationary relative to the background. The sensitivity determination module 203 determines whether the specified target is a sensitive target. The determination performed on the extracted specified targets can improve the accuracy of selecting the to-be-masked region, and thus improve the accuracy of video desensitization. An automatic extraction of the to-be-masked region is achieved, which avoids a lot of work for labeling the to-be-masked region manually and yield a highly efficient extraction of the to-be-masked regions. The further classification or identification of the detected specified targets prevents non-sensitive targets similar to the sensitive targets from being incorrectly extracted, allowing for a more accurate extraction of sensitive targets.

Figure 3:
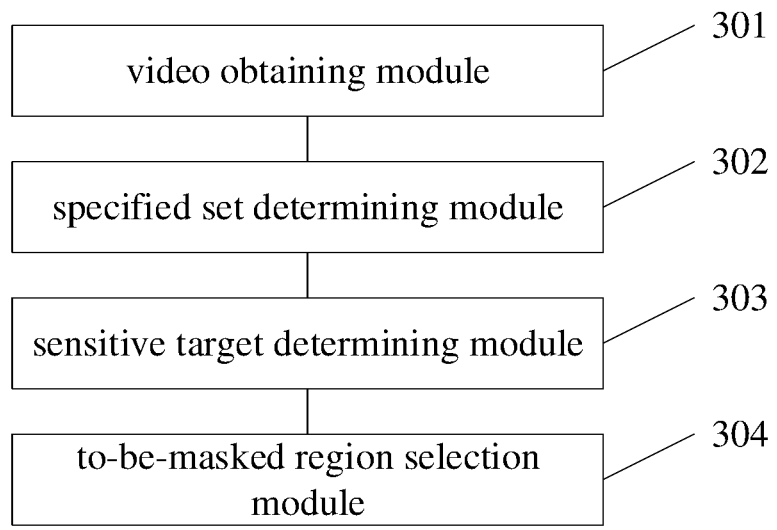
FIG. 3 is a diagram of an apparatus for selecting a to-be-masked region in a video according to an embodiment of the present application.

Referring to FIG. 3, an embodiment of the present application provides an apparatus for selecting a to-be-masked region in a video, which includes a video obtaining module 301, a specified set determining module 302, a sensitive target determining module 303, and a to-be-masked region selection module 304.

The video obtaining module 301 is configured for obtaining a video to be detected.

The specified set determining module 302 is configured for determining specified target sets in the video through a preset target detection algorithm, wherein each specified target set is a set of pixels of one specified target in video frames of the video.

The sensitive target determining module 303 is configured for determining whether a specified target corresponding to each specified target set is a sensitive target respectively through a preset recognition algorithm.

The to-be-masked region selection module 304 is configured for using a specified target set as to-be-masked regions in the video when a specified target corresponding to this specified target set is determined as a sensitive target.

In the embodiment of the present application, specified targets are first determined through the target detection algorithm, and then the specified targets are classified or recognized to determine whether the specified targets are sensitive targets. In comparison with a moving target detection method or a sensitive region segmentation method, the embodiment of the present application determines a specified target through the target detection algorithm, which can more accurately determine regions corresponding to the specified target that is stationary or almost stationary relative to the background. The specified targets are classified and recognized to determine the sensitivity of the specified targets again, which can improve the accuracy of selecting the to-be-masked regions. An automatic extraction of the to-be-masked region is achieved, which avoids a lot of work for labeling the to-be-masked regions manually and yield a highly efficient extraction of the to-be-masked regions. The further classification or identification of the detected specified targets prevents non-sensitive targets similar to the sensitive targets from being incorrectly extracted, allowing for a more accurate extraction of sensitive targets.

Optionally, the apparatus for selecting a to-be-masked region in a video further includes:

a masking module, configured for masking the to-be-masked regions in the video frames of the video.

In the embodiment of the present application, the video to be detected is desensitized by masking the pixels in the to-be-masked regions in the video frames of the video to be detected.

Optionally, the specified set determining module 302 includes:

a target detection sub-module, configured for detecting regions corresponding to all specified targets in each video frame of the video respectively through the preset target detection algorithm;

a target association sub-module, configured for, for each of the specified targets, associating regions corresponding to the specified target in chronological order to obtain a trajectory of the specified target; and a target set sub-module, configured for using the trajectories of the specified targets as the specified target sets for the specified targets in the video.

In the embodiment of the present application, regions corresponding to the specified targets are determined by using the target detection algorithm, and regions corresponding to a same specified target are associated in chronological order to obtain a specified target set. In comparison with a moving target detection method or a sensitive region segmentation method, the embodiment of the present application can more accurately determine regions corresponding to a specified target that is stationary or almost stationary relative to the background, and obtain a more accurate specified target set.

Optionally, the target detection sub-module includes:

a region partition unit, configured for partitioning each video frame of the video into a preset number of regions to obtain a plurality of pixel regions;

a first feature obtaining unit, configured for extracting a feature of each pixel region respectively through a pre-trained convolutional neural network;

a target matching unit, configured for determining whether each pixel region matches with any of the specified targets through a preset classifier according to the feature of the pixel region; and a region determining unit, configured for, in response to a pixel region matching with a specified target, determining a region corresponding to the specified target through a bounding box regression algorithm based on all pixel regions matching with the specified target.

In the embodiment of the present application, a specific process for determining a region corresponding to a specified target is provided. Of course, in an embodiment of the present application, the region corresponding to each specified target may also be determined by using algorithms such as Boosting, FRCNN, Faster RCNN, SSD, or the like.

Optionally, the target association sub-module includes:

a second feature obtaining unit, configured for extracting features of regions corresponding to all the specified targets in each video frame of the video to obtain region features;

a set determining unit, configured for determining a set of region features corresponding to each specified target respectively from all the region features through a preset multi-target tracking algorithm; and a target trajectory determining unit, configured for associating regions corresponding to each set of region features in chronological order respectively to obtain a trajectory of each specified target.

In the embodiment of the present application, the specified target sets are determined through the multi-target tracking algorithm, which makes the obtained specified target sets more accurate.

Optionally, the sensitive target determining module 303 includes:

a video frame selection sub-module, configured for, for each specified target set, selecting a preset number of specified target video frames from video frames corresponding to the specified target set according to a preset video frame extraction manner;

a first determination sub-module, configured for recognizing the specified target in all specified target video frames through a preset recognition algorithm to obtain a target recognition result; and a second determination sub-module, configured for determining that the specified target corresponding to the target recognition result is a sensitive target when the target recognition result meets a preset determination rule; or determining that the specified target corresponding to the target recognition result is not a sensitive target when the target recognition result does not meet the preset determination rule.

In the embodiment of the present application, one specified target is recognized multiple times to determine whether this specified target is a sensitive target based on the results obtained from the multiple recognitions. In this way, the occasionality during the determination is reduced resulting in a more accurate determination.

Optionally, the first determination sub-module includes:

a third feature obtaining unit, configured for extracting features of the specified targets in all the specified target video frames to obtain target features;

a sensitive feature recognition unit, configured for recognizing sensitive features from the target features through a preset target classification algorithm or a recognition algorithm; and a recognition result determining unit, configured for using a relation between the number of the sensitive features and the number of all the target features as the target recognition result.

In the embodiment of the present application, a specific process for determining the target recognition result is provided, which reduces the occasionality during the determination process and results in a more accurate determination result.

An embodiment of the present application further provides an electronic device, including a processor and a memory, wherein the memory is configured for storing a computer program, and the processor is configured for implementing any of above methods for selecting a to-be-masked region in a video when executing the program stored in the memory.

Figure 4:
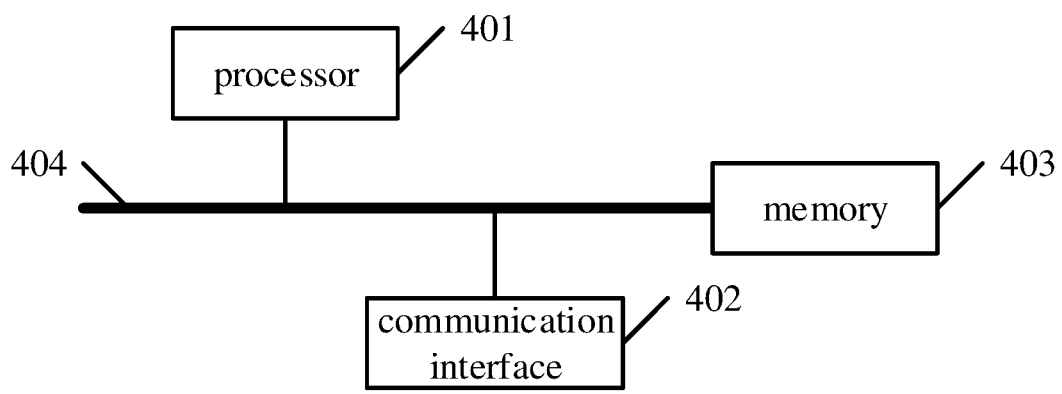
FIG. 4 is a diagram of an electronic device according to an embodiment of the present application.

Optionally, the electronic device according to the embodiment of the present application is specifically shown in FIG. 4, which includes a processor 401, a communication interface 402, a memory 403 and a communication bus 404. The processor 401, the communication interface 402 and the memory 403 communicate with each other through the communication bus 404.

The memory 403 is configured for storing a computer program.

The processor 401 is configured for executing the program stored in the memory 403 to carry out operations including:

obtaining a video to be detected; determining specified target sets in the video through a preset target detection algorithm, wherein each specified target set is a set of pixels of one specified target in video frames of the video; determining whether a specified target corresponding to each specified target set is a sensitive target respectively through a preset recognition algorithm; and using a specified target set as to-be-masked regions in the video when a specified target corresponding to this specified target set is determined as a sensitive target.

In the embodiment of the present application, The specified targets in each video frame are detected through the target detection algorithm, and pixels of the specified targets are used as respective specified target sets, which can more accurately determine regions corresponding to the specified target that is stationary or almost stationary relative to the background. The specified targets are classified and recognized through recognition algorithm to determine the sensitivity of the specified targets again, which can improve the accuracy of selecting the to-be-masked regions An automatic extraction of the to-be-masked region is achieved, which avoids a lot of work for labeling the to-be-masked regions manually and yield a highly efficient extraction of the to-be-masked regions. The further classification or identification of the detected specified targets prevents non-sensitive targets similar to the sensitive targets from being incorrectly extracted, allowing for a more accurate extraction of sensitive targets.

Optionally, when executing the program stored in the memory 403, the processor 401 is configured for:

masking the to-be-masked regions in the video frames of the video.

Optionally, in the electronic device according to the embodiment of the present application, determining specified target sets in the video through a preset target detection algorithm includes:

detecting regions corresponding to all specified targets in each video frame of the video respectively through the preset target detection algorithm;

for each of the specified targets, associating regions corresponding to the specified target in chronological order to obtain a trajectory of the specified target; and using the trajectories of the specified targets as the specified target sets for the specified targets in the video.

Optionally, in the electronic device according to the embodiment of the present application, detecting regions corresponding to all specified targets in each video frame of the video respectively through the preset target detection algorithm includes:

partitioning each video frame of the video into a preset number of regions to obtain a plurality of pixel regions;

extracting a feature of each pixel region respectively through a pre-trained convolutional neural network;

determining whether each pixel region matches with any of the specified targets through a preset classifier according to the feature of the pixel region; and in response to a pixel region matching with a specified target, determining a region corresponding to the specified target through a bounding box regression algorithm based on all pixel regions matching with the specified target.

Optionally, in the electronic device according to the embodiment of the present application, for each of the specified targets, associating regions corresponding to the specified target in chronological order to obtain a trajectory of the specified target includes:

extracting features of regions corresponding to all the specified targets in each video frame of the video to obtain region features;

determining a set of region features corresponding to each specified target respectively from all the region features through a preset multi-target tracking algorithm; and associating regions corresponding to each set of region features in chronological order respectively to obtain a trajectory of each specified target.

Optionally, in the electronic device according to the embodiment of the present application, determining whether a specified target corresponding to each specified target set is a sensitive target respectively through the preset recognition algorithm includes:

for each specified target set, selecting a preset number of specified target video frames from video frames corresponding to the specified target set according to a preset video frame extraction manner;

recognizing the specified target in all specified target video frames through a preset recognition algorithm to obtain a target recognition result;

determining that the specified target corresponding to the target recognition result is a sensitive target when the target recognition result meets a preset determination rule; or determining that the specified target corresponding to the target recognition result is not a sensitive target when the target recognition result does not meet the preset determination rule.

Optionally, in the electronic device according to the embodiment of the present application, recognizing the specified target in all specified target video frames through a preset recognition algorithm to obtain a target recognition result includes:

extracting features of the specified targets in all the specified target video frames to obtain target features;

recognizing sensitive features from the target features through a preset target classification algorithm or a recognition algorithm; and using a relation between the number of the sensitive features and the number of all the target features as the target recognition result.

The communication bus in the above electronic device may be a peripheral component interconnect (PCI) bus or an extended industry standard architecture (EISA) bus, or the like. The communication bus may be divided into an address bus, a data bus, a control bus, or the like. For ease of representation, only one thick line is illustrated in the drawings, which does not mean that there is only one bus or one type of bus.

The communication interface is used for communication between the above electronic device and other devices.

The memory may include a random access memory (RAM), and may also include a non-volatile memory (NVM), such as at least one disk memory. Optionally, the memory may also be at least one storage device located away from the processor.

The above processor may be a general purpose processor, including a central processing unit (CPU), a network processor (NP), etc.; it may also be a digital signal processing (DSP), an application specific integrated circuit (ASIC), a field-programmable gate array (FPGA) or other programmable logic devices, discrete gates or transistor logic devices, discrete hardware components.

An embodiment of the present application further provides a computer readable storage medium having stored thereon a computer program that, when executed by a processor, causes the processor to implement operations including:

obtaining a video to be detected; determining specified target sets in the video through a preset target detection algorithm, wherein each specified target set is a set of pixels of one specified target in video frames of the video; determining whether a specified target corresponding to each specified target set is a sensitive target respectively through a preset recognition algorithm; and using a specified target set as to-be-masked regions in the video when a specified target corresponding to this specified target set is determined as a sensitive target.

In the embodiment of the present application, The specified targets in each video frame are detected through the target detection algorithm, and pixels of the specified targets are used as respective specified target sets, which can more accurately determine regions corresponding to the specified target that is stationary or almost stationary relative to the background. The specified targets are classified and recognized through recognition algorithm to determine the sensitivity of the specified targets again, which can improve the accuracy of selecting the to-be-masked regions. An automatic extraction of the to-be-masked region is achieved, which avoids a lot of work for labeling the to-be-masked regions manually and yield a highly efficient extraction of the to-be-masked regions. The further classification or identification of the detected specified targets prevents non-sensitive targets similar to the sensitive targets from being incorrectly extracted, allowing for a more accurate extraction of sensitive targets.

Optionally, when executed by the processor, the computer program can also implement any step of the above methods for selecting a to-be-masked region in a video.

An embodiment of the present application provides a system for selecting a to-be-masked region in a video, and the system includes a video capturing device and a video processor.

The video capturing module is configured for capturing a video to be detected.

The video processor is configured for implementing operations including:

obtaining a video to be detected; determining specified target sets in the video through a preset target detection algorithm, wherein each specified target set is a set of pixels of one specified target in video frames of the video; determining whether a specified target corresponding to each specified target set is a sensitive target respectively through a preset recognition algorithm; and using a specified target set as to-be-masked regions in the video when a specified target corresponding to this specified target set is determined as a sensitive target.

In the embodiment of the present application, In the embodiment of the present application, a specified target or targets in each video frame are detected by using the target detection algorithm, and pixels of each specified target in all frames are used as a specified target set. It is not required to predict the trajectory of a moving target, and thus it can more accurately determine a region corresponding to a specified target that is stationary or almost stationary relative to the background. The specified target or targets are classified or recognized by using the recognition algorithm to determine the sensitivity of the specified targets again, which can reduce erroneous extraction of sensitive targets and improve the accuracy of selecting the to-be-masked regions. An automatic extraction of the to-be-masked region is achieved, which avoids a lot of work for labeling the to-be-masked regions manually and yield a highly efficient extraction of the to-be-masked regions.

Optionally, the video processor can also implement any of the above methods for selecting a to-be-masked region in a video.

For the embodiments of the apparatus, the electronic device, the system for selecting a to-be-masked region in a video, and the computer readable storage medium, they are described briefly since they are substantially similar to the method embodiment, and the related parts can be referred to the corresponding description of the method embodiment.

It should be noted that the relationship terms used herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the system is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

The invention claimed is:

1. A method for selecting a to-be-masked region in a video, comprising:
   obtaining a video to be detected;
   determining specified target sets in the video through a preset target detection algorithm, wherein each specified target set is a set of pixels of one specified target in video frames of the video, the specified target is a preset target that needs to be masked, and the preset target detection algorithm is any algorithm that can identify a specified target;
   determining whether a specified target corresponding to each specified target set is a sensitive target respectively through a preset recognition algorithm;
   using the specified target set as to-be-masked regions in the video when a specified target corresponding to this specified target set is determined as a sensitive target;
   wherein determining whether the specified target corresponding to each specified target set is the sensitive target respectively through the preset recognition algorithm comprises: for each specified target set, selecting a preset number of specified target video frames from video frames corresponding to the specified target set according to a preset video frame extraction manner; recognizing the specified target in all specified target video frames through the preset recognition algorithm to obtain a target recognition result; and
   wherein recognizing the specified target in all specified target video frames through the preset recognition algorithm to obtain the target recognition result comprises: extracting features of the specified targets in all the specified target video frames to obtain target features;
   recognizing sensitive features from the target features through a preset target classification algorithm or the recognition algorithm; and using a relation between the number of the sensitive features and the number of all the target features as the target recognition result;
   wherein determining specified target sets in the video through the preset target detection algorithm comprises:
   detecting regions corresponding to all specified targets in each video frame of the video respectively through the preset target detection algorithm;
   for each of the specified targets, associating regions corresponding to the specified target in chronological order to obtain a trajectory of the specified target; and
   using the trajectories of the specified targets as the specified target sets for the specified targets in the video.

2. The method according to claim 1, wherein after using each specified target set as to-be-masked regions in the video when the specified target corresponding to this specified target set is determined as a sensitive target, the method further comprises:
   masking the to-be-masked regions in the video frames of the video.

3. The method according to claim 1, wherein detecting regions corresponding to all specified targets in each video frame of the video respectively through the preset target detection algorithm comprises:
   partitioning each video frame of the video into a preset number of regions to obtain a plurality of pixel regions;
   extracting a feature of each pixel region respectively through a pre-trained convolutional neural network;
   determining whether each pixel region matches with any of the specified targets through a preset classifier according to the feature of the pixel region; and
   in response to a pixel region matching with a specified target, determining a region corresponding to the specified target through a bounding box regression algorithm based on all pixel regions matching with the specified target.

4. The method according to claim 1, wherein for each of the specified targets, associating regions corresponding to the specified target in chronological order to obtain a trajectory of the specified target comprises:
   extracting features of regions corresponding to all the specified targets in each video frame of the video to obtain region features;
   determining a set of region features corresponding to each specified target respectively from all the region features through a preset multi-target tracking algorithm; and
   associating regions corresponding to each set of region features in chronological order respectively to obtain a trajectory of each specified target.

5. The method according to claim 1, wherein determining whether the specified target corresponding to each specified target set is the sensitive target respectively through the preset recognition algorithm further comprises:
   determining that the specified target corresponding to the target recognition result is the sensitive target when the target recognition result meets a preset determination rule; or
   determining that the specified target corresponding to the target recognition result is not the sensitive target when the target recognition result does not meet the preset determination rule.

6. An electronic device, comprising a processor and a memory, wherein
   the memory is configured for storing a computer program; and
   the processor is configured for executing the program stored in the memory to carry out operations comprising:
   obtaining a video to be detected;
   determining specified target sets in the video through a preset target detection algorithm, wherein each specified target set is a set of pixels of one specified target in video frames of the video, the specified target is a preset target that needs to be masked, and the preset target detection algorithm is any algorithm that can identify a specified target;

determining whether a specified target corresponding to each specified target set is a sensitive target respectively through a preset recognition algorithm;

using the specified target set as to-be-masked regions in the video when a specified target corresponding to this specified target set is determined as a sensitive target;

wherein determining whether the specified target corresponding to each specified target set is the sensitive target respectively through the preset recognition algorithm comprises: for each specified target set, selecting a preset number of specified target video frames from video frames corresponding to the specified target set according to a preset video frame extraction manner; recognizing the specified target in all specified target video frames through the preset recognition algorithm to obtain a target recognition result; and wherein recognizing the specified target in all specified target video frames through the preset recognition algorithm to obtain the target recognition result comprises: extracting features of the specified targets in all the specified target video frames to obtain target features; recognizing sensitive features from the target features through a preset target classification algorithm or the recognition algorithm; and using a relation between the number of the sensitive features and the number of all the target features as the target recognition result;

wherein determining specified target sets in the video through the preset target detection algorithm comprises:

detecting regions corresponding to all specified targets in each video frame of the video respectively through the preset target detection algorithm;

for each of the specified targets, associating regions corresponding to the specified target in chronological order to obtain a trajectory of the specified target; and using the trajectories of the specified targets as the specified target sets for the specified targets in the video.

7. The electronic device according to claim 6, wherein detecting regions corresponding to all specified targets in each video frame of the video respectively through the preset target detection algorithm comprises:

partitioning each video frame of the video into a preset number of regions to obtain a plurality of pixel regions;

extracting a feature of each pixel region respectively through a pre-trained convolutional neural network;

determining whether each pixel region matches with any of the specified targets through a preset classifier according to the feature of the pixel region; and in response to a pixel region matching with a specified target, determining a region corresponding to the specified target through a bounding box regression algorithm based on all pixel regions matching with the specified target.

8. The electronic device according to claim 6, wherein for each of the specified targets, associating regions corresponding to the specified target in chronological order to obtain a trajectory of the specified target comprises:

extracting features of regions corresponding to all the specified targets in each video frame of the video to obtain region features;

determining a set of region features corresponding to each specified target respectively from all the region features through a preset multi-target tracking algorithm; and associating regions corresponding to each set of region features in chronological order respectively to obtain a trajectory of each specified target.

9. The electronic device according to claim 6, wherein determining whether the specified target corresponding to each specified target set is the sensitive target respectively through the preset recognition algorithm further comprises:

determining that the specified target corresponding to the target recognition result is the sensitive target when the target recognition result meets a preset determination rule; or determining that the specified target corresponding to the target recognition result is not the sensitive target when the target recognition result does not meet the preset determination rule.

10. A system for selecting a to-be-masked region in a video, comprising a video capturing device and a video processor; wherein the video capturing device is configured for capturing a video to be detected; and the video processor is configured for carrying out operations comprising:

obtaining a video to be detected;

determining specified target sets in the video through a preset target detection algorithm, wherein each specified target set is a set of pixels of one specified target in video frames of the video, the specified target is a preset target that needs to be masked, and the preset target detection algorithm is any algorithm that can identify a specified target;

determining whether a specified target corresponding to each specified target set is a sensitive target respectively through a preset recognition algorithm; and using the specified target set as to-be-masked regions in the video when a specified target corresponding to this specified target set is determined as a sensitive target;

wherein determining whether the specified target corresponding to each specified target set is the sensitive target respectively through the preset recognition algorithm comprises: for each specified target set, selecting a preset number of specified target video frames from video frames corresponding to the specified target set according to a preset video frame extraction manner; recognizing the specified target in all specified target video frames through the preset recognition algorithm to obtain a target recognition result; and wherein recognizing the specified target in all specified target video frames through the preset recognition algorithm to obtain the target recognition result comprises: extracting features of the specified targets in all the specified target video frames to obtain target features; recognizing sensitive features from the target features through a preset target classification algorithm or the recognition algorithm; and using a relation between the number of the sensitive features and the number of all the target features as the target recognition result;

wherein determining specified target sets in the video through the preset target detection algorithm comprises:

detecting regions corresponding to all specified targets in each video frame of the video respectively through the preset target detection algorithm;

for each of the specified targets, associating regions corresponding to the specified target in chronological order to obtain a trajectory of the specified target; and using the trajectories of the specified targets as the specified target sets for the specified targets in the video.

11. The system according to claim 10, wherein detecting regions corresponding to all specified targets in each video frame of the video respectively through the preset target detection algorithm comprises:
   partitioning each video frame of the video into a preset number of regions to obtain a plurality of pixel regions;
   extracting a feature of each pixel region respectively through a pre-trained convolutional neural network;
   determining whether each pixel region matches with any of the specified targets through a preset classifier according to the feature of the pixel region; and
   in response to a pixel region matching with a specified target, determining a region corresponding to the specified target through a bounding box regression algorithm based on all pixel regions matching with the specified target.

12. The system according to claim 10, wherein for each of the specified targets, associating regions corresponding to the specified target in chronological order to obtain a trajectory of the specified target comprises:
   extracting features of regions corresponding to all the specified targets in each video frame of the video to obtain region features;
   determining a set of region features corresponding to each specified target respectively from all the region features through a preset multi-target tracking algorithm; and
   associating regions corresponding to each set of region features in chronological order respectively to obtain a trajectory of each specified target.

13. The system according to claim 10, wherein determining whether the specified target corresponding to each specified target set is the sensitive target respectively through the preset recognition algorithm comprises:
   determining that the specified target corresponding to the target recognition result is the sensitive target when the target recognition result meets a preset determination rule; or
   determining that the specified target corresponding to the target recognition result is not the sensitive target when the target recognition result does not meet the preset determination rule.

* * * * *